Jan. 8, 1952 L. QUIJADA 2,581,702
WORK TURNING AND THREADING MACHINE
Filed March 16, 1946 3 Sheets-Sheet 1
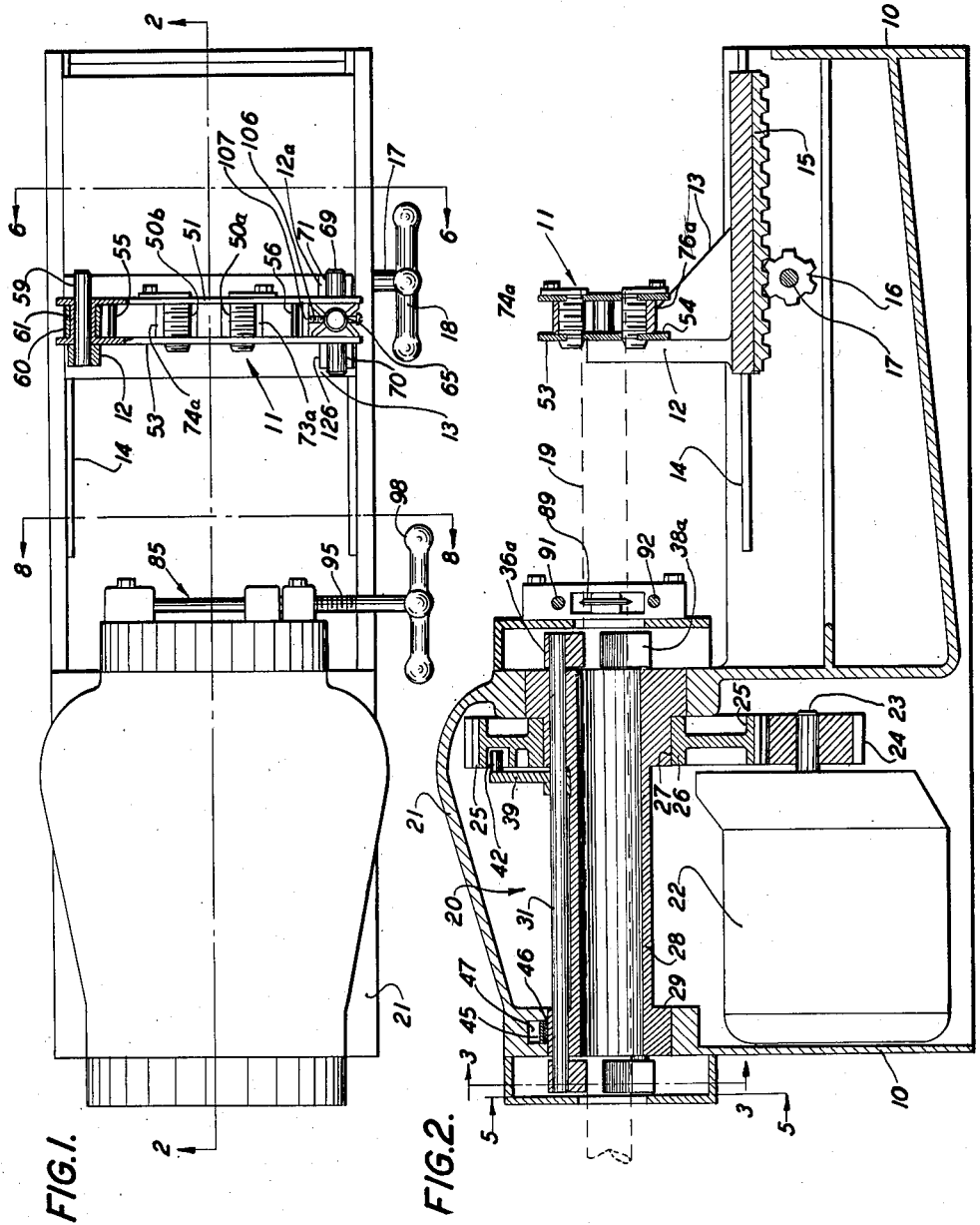
INVENTOR.
LOUIS QUIJADA
BY
Christie & Angus
ATTORNEYS Jan. 8, 1952     L. QUIJADA     2,581,702
WORK TURNING AND THREADING MACHINE Filed March 16, 1946     3 Sheets-Sheet 2

INVENTOR.
LOUIS QUIJADA
BY
*Christie & Angus*
ATTORNEYS

Jan. 8, 1952 — L. QUIJADA — 2,581,702
WORK TURNING AND THREADING MACHINE
Filed March 16, 1946 — 3 Sheets-Sheet 3
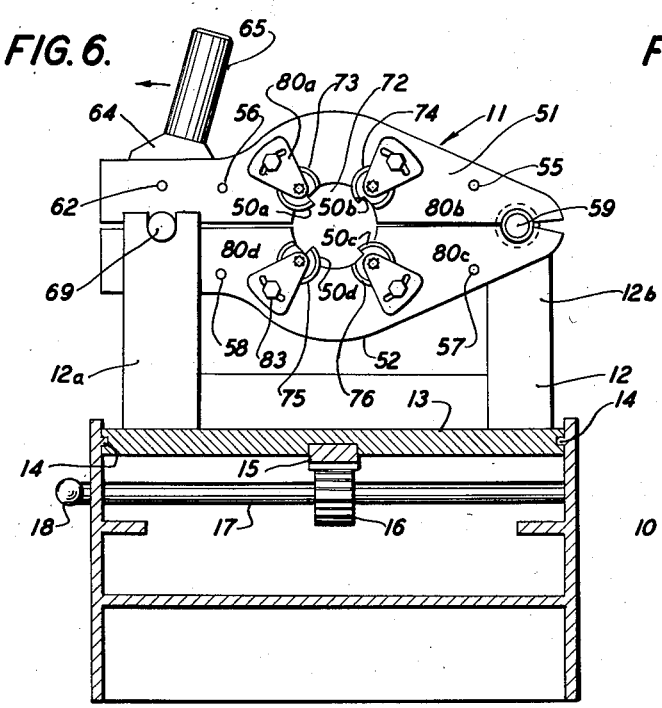

Patented Jan. 8, 1952

2,581,702

UNITED STATES PATENT OFFICE 2,581,702

WORK TURNING AND THREADING MACHINE

Louis Quijada, Alhambra, Calif.

Application March 16, 1946, Serial No. 654,916

6 Claims. (Cl. 10—107)

This invention relates to machines for turning workpieces on which work is performed, and especially to machines adapted to cut thread on pipes, rods, bolts and the like.

The object of the invention is to provide a power-driven machine of relatively simple construction, having a chuck which easily grips and ungrips the workpiece.

According to my invention, I provide a chuck which is turned from a power drive; and a feature of the chuck is the provision of gripping members for gripping the workpiece, these gripping members being moved to their gripping position by the power drive itself. By this arrangement, the turning on of the power performs the function of both gripping the workpiece and of turning it. A reversal of the power drive will ungrip the workpiece.

A further feature is the provision of means for cutting off the workpiece while it is being turned.

The foregoing and other features of my invention will be better understood from the following detailed description and accompanying drawings of which:

Fig. 1 is a top view of a thread-cutting machine, partially in section, in accordance with my invention;

Fig. 2 is a side elevation view of the machine taken in section at line 2—2 of Fig. 1;

Fig. 6 is an end elevation view showing a die according to my invention, mounted on its carriage, the carriage being a cross-section taken at line 6—6 of Fig. 1;

Fig. 7 shows a detail used with the die of Fig. 6;

Fig. 8 shows another detail used with the die;

Fig. 9 shows still another detail as used with the die;

Fig. 10 is a side view of a die member;

Fig. 11 is an end view of the die member shown in Fig. 10; and

Fig. 12 is a view taken at line 8—8 of Fig. 1, showing a cutting device which may be used with the machine.

Figure 3:
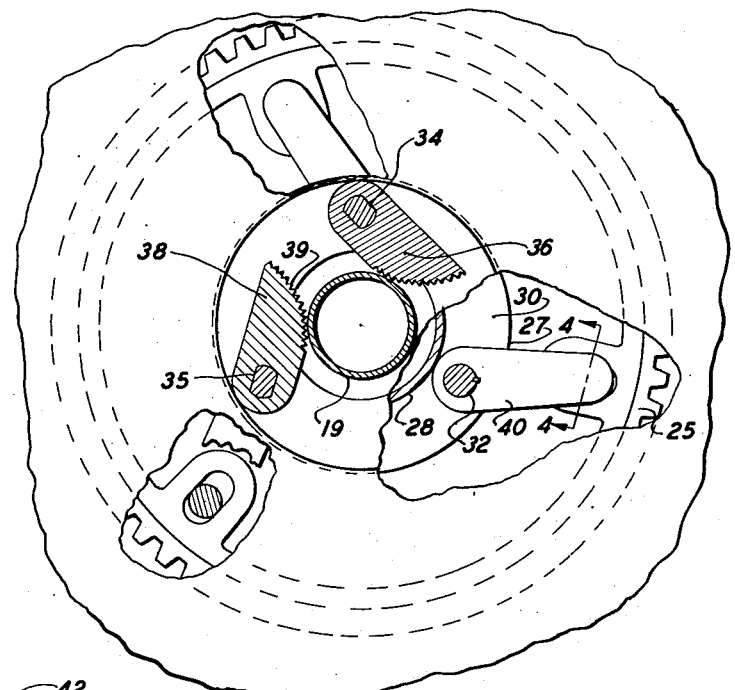
Fig. 3 is a cross-sectional view taken at line 3—3 of Fig. 2, with part of the housing broken away to show the mechanism within the housing.
Figure 4:
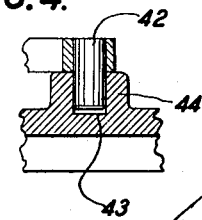
Fig. 4 is a detail view in cross-section taken at line 4—4 of Fig. 3.

Referring to the drawings, the machine is provided with a rigid frame 10 including legs by which it stands on a floor, the machinery and apparatus being supported at a convenient height above the floor for working purposes. The cutting device comprises a die 11 held on a support 12, which is mounted on a carriage 13. The carriage 13 is arranged to slide on tracks 14. The carriage is provided with a rack 15 between the tracks; and a pinion 16 fastened to a shaft 17, journaled in the fixed frame, serves to move the rack one way or the other by turning handle 18.

For the purpose of putting threads on a workpiece 19, such as a pipe, shown in dotted outline in Fig. 2, there is provided a holding and driving mechanism 20 housed within housing 21. The housing 21 is mounted on the main support of the machine and comprises a chuck with grippers for holding the workpiece, and arranged to be power-driven. The driving power is provided by a motor 22 such as an ordinary electric motor. The motor shaft 23 has mounted on it a driving pinion 24, which drives a gear wheel 25. The hub of the gear wheel is mounted to rotate freely on the bearing surface 27 of a hollow shaft 28. The hollow shaft 28 is provided with a pair of spaced collars or flanges 29 and 30 respectively, and there are journaled to these collars three shafts or rods 31, 32 and 33, spaced 120° apart around the periphery of the hollow shaft 28.

The ends of the three shafts which protrude beyond the collars are flat at two sides as shown at 34 and 35 for the rods 31 and 33 respectively. There are fitted over these flat ends gripping cams or members 36, 37 and 38 respectively, at one end, and 36a, 37a and 38a respectively at the other end, the cams 37 and 37a, not appearing in the figures. Each of the cams is provided along its gripping surface with gripping teeth 39. The arrangement is such that the turning of the shafts 31, 32 and 33 in the clockwise direction, with reference to Figs. 3 and 5, turns the gripping cams to move their camming surfaces closer together, so as to grip the workpiece 19 which in this case is shown as a pipe.

For the purpose of turning the gripper rods, there is provided for each rod a crank, these cranks being numbered 39, 40 and 41 respectively. At the outer end of each crank, there is provided a crank pin 42, and each crank pin fits into a slot 43 of a lug 44, which is attached to the gear wheel 25. The arrangement is such that when the gear-wheel 25 is rotated clockwise (with reference to Figs. 3 and 5), by the motor 22, the cranks are rotated somewhat clockwise, and the crank pins 42 move outwardly in slots 43, thereby rotating the gripper cams from their normal retracted positions (shown in Fig. 5) until the gripper teeth grip the workpiece, as shown in Fig. 3. When the workpiece has thus been gripped, the motor drive acting through gear wheel 25 turns the entire chuck mechanism, thereby rotating the workpiece.

To keep the hollow shaft from rotating until the grip has turned to grip the pipe, there is provided a friction member. This comprises a metallic segment of a band such as a band 45 surfaced with a suitable friction material or fabric 46. This band is placed within an annular groove 47 at the end of the housing, of sufficient length to hold the band, and is arranged so that the friction material is placed against the collar 29. The friction material is arranged to bear with moderate intensity against collar 29; and to keep this intensity uniform in spite of wear which may occur in the material there are provided pressure springs 48 around the periphery of the band, each pressure spring being mounted over a pin 49 set into the housing.

The die 11 comprises a die holder formed by two side members with the dies 50 (Figs. 10 and 11) extending therebetween. Each side member consists of an upper and a lower part, the rear side member comprising the upper part 51 and the lower part 52; and the forward side member comprising the upper part 53 and the lower part 54. The two upper parts 51 and 53 are spaced apart as shown and held together in the spaced position by pins 55 and 56 which may be crimped to the parts in a suitable manner. The two lower parts 52 and 54 are similarly held together in the spaced-apart position by pins 57 and 58. The two upper parts 51 and 53 comprise an upper section of the die holder, and the lower parts 52 and 54 comprise a lower section. The two sections are movable relative to each other.

The die holder is mounted on the post 12 by means of a pin 59 which passes through holes in the post as shown. The upper die pieces 51 and 53 are attached or welded to the end of a bushing 60, and the lower side pieces 52 and 54 are similarly fastened to an outer bushing 61 which rides around the circumference of the inner bushing 60. As the inner bushing is placed around pin 59, the arrangement is to enable the upper die-holding section to pivot on pin 59 relative to the lower die-holding section.

The ends of the die holder opposite the pin 59 are provided with means for clamping the upper and lower die-holding sections together. This means comprises a pin 62 fastened through the upper members 51 and 53, and a similar pin fastened through the lower members just below pin 62. A wrench 64 (see Fig. 7) provided with two forks 64a and 64b (Fig. 9) and a handle 65, is adapted to pivot the upper and the lower die sections about pin 59 to a limited extent to permit the pipe to be inserted through the die. To do this, the wrench is provided with camming slots 66 and 67 and a centrally located hole 68, these slots and hole being in both forks of the wrench. A pin 69 passes through the hole 68 and through corresponding openings through the die-holder portions and extends on either side sufficiently to engage the recesses 70 and 71 at the top of pillars 12a and 12b. The pins 62 and 63 extend through the camming slots 66 and 67 respectively so that when the wrench 65 is pivoted on pin 69, the upper and lower portions of the die holder can be clamped together by pulling the handle in the direction opposite the arrow in Fig. 6, and can be opened apart somewhat by pulling the handle in the direction of the arrow.

A refinement which is preferable is an adjusting screw 105 on the handle fork with a lock nut 106 (Fig. 9). The end of the screw strikes a stop bar 107 fastened to the die holder. By turning the screw the travel of the handle toward the closed die position can be adjusted. Thus, to cut a light thread, the screw may be turned in somewhat so that the die holder does not quite close completely.

The central portion of the die holder is formed on both sides in the shape of a circle 72 which is the usual circle through which the workpiece turns. Four holes 73, 74, 75 and 76 are provided through the die holder as shown, two of these holes being through the upper die holder members 51 and 53 and the other two being correspondingly in the lower die holding members 52 and 54. These holes pass through corresponding bosses 73a, 74a, 75a and 76a, which are attached to the side members on one side. The bosses are shown attached to side members 51 and 52. The holes are located at the edges of the die-holding members adjacent the circular portion 72 such that the center of each hole is at a lesser distance from the periphery of circle 72 than the radius of the hole. This is to allow the cutting edges of the die members to extend into the circle 72 as shown. Each of these four holes through the bosses is threaded to receive a cutting die 50, these dies being numbered respectively 50a, 50b, 50c and 50d.

Referring to Figs. 10 and 11, each die is in the form of a threaded cylindrical barrel with a longitudinal cutout portion 77 providing a cutting edge 78. To set the four dies into position they are threaded through the respective holes and set so that the cutting edges 78 extend into the cutting position with the circle 72 as shown in Fig. 6. The threads through the bosses should correspond with the cutting threads of the dies, and the threads of all the bosses are arranged to track properly with respect to the threads to be cut into the workpiece. This insures that the cutting threads of all the dies will always track.

The end of each die is provided with a square head 79. After the dies are set in position they are held in proper angular position by means of individual holding element 80 (Fig. 8), the individual holding elements in Fig. 6 being numbered 80a, 80b, 80c and 80d, respectively. Each holding element is provided with a multi-cornered cutout 81, the corners of which are adapted to fit over the corners of the square 79 of the die. Each holding element 80 is furthermore provided with a segmental slot 82 adapted to be engaged by the head of a locking bolt 83. The arrangement provides adjustment for the individual dies, as the holding member 80 may be rotated through ⅛ of a revolution which is the segmental length of the slot 82, and can be held in any such angular position within the angle of adjustment, by tightening down the bolt 83 which extends through the corresponding side of the die holder. In this way take-up is provided for the dies when they wear down or are sharpened and replaced.

A feature of the machine which is optional and convenient is a cutting device 85 (Fig. 12). This cutting member is fastened at the rear of the chuck housing at the position where the pipe to be threaded leaves the chuck in extending toward the die. The cutting member comprises an end member 86 provided with a centrally located slot 87 across which there extends a pin 88 on which is mounted a cutting disc 89. The cutting disc is free to rotate on the pin and is provided with a sharp cutting edge 90. There is fastened through each side of holder 86 a bolt 91 and 92 to the opposite end of which is fastened a head 93 by threading or otherwise. A sliding member 94 is provided with holes on either side through which bolts 91 and 92 extend so that the sliding member may slide back and forth on the bolt. The position of the sliding member is controlled by an adjustment bolt 95 threaded through a hole through head 93 and provided with an engaging end 96 which engages within a suitable recess 97 of member 94. A handle on the end of bolt 95 serves to turn the bolt and thereby move member 94 back and forth along rods 91 and 92.

Member 94 is provided with a central slot 99 corresponding to the slot 87 in member 86. There are provided through this large center slot 99, pins 100 and 101 and on these pins there are mounted within the slot cutting discs 102 and 103, these cutting discs being provided with sharp peripheries like cutting edge 90 on disc 89.

After the workpiece is threaded on the die member, it may be cut off by cutting member 85 while the chuck is turning the workpiece, simply by turning down on handle 98 to shorten the distance between cutting disc 89 and disc 102 and 103. In this way the cutting edges will cut through the pipe as desired.

To operate the machine, the workpiece to be cut, such as the pipe or bolt to be threaded, is inserted through the hollow shaft of the chuck and out to the die. The distance of the die holder from the chuck is set by turning handle 18 so that the die will be the proper distance from the cutting knife 85, so that the workpiece may be cut off at the right length. Then the motor may be turned on in the forward direction, which will first cause the grippers to be rotated so that the gripping teeth grip the workpiece at both ends of the chuck. Following this, the chuck will automatically start to turn. The handle 18 of the die holder carriage will then be turned to cause the cutting piece of the die members to start the thread around the workpiece. After the thread is started the die holder carriage will automatically continue to creep forward along the workpiece to cut the thread. After the thread is cut as desired, the handle 64 is moved to the retracting position to free the dies from the cut, thereby enabling the work to be withdrawn from the die. At the same time, the handle 98 of the cutter may be screwed inward to cut off the desired length of pipe or bolt, while the workpiece is still turning.

Figure 5:
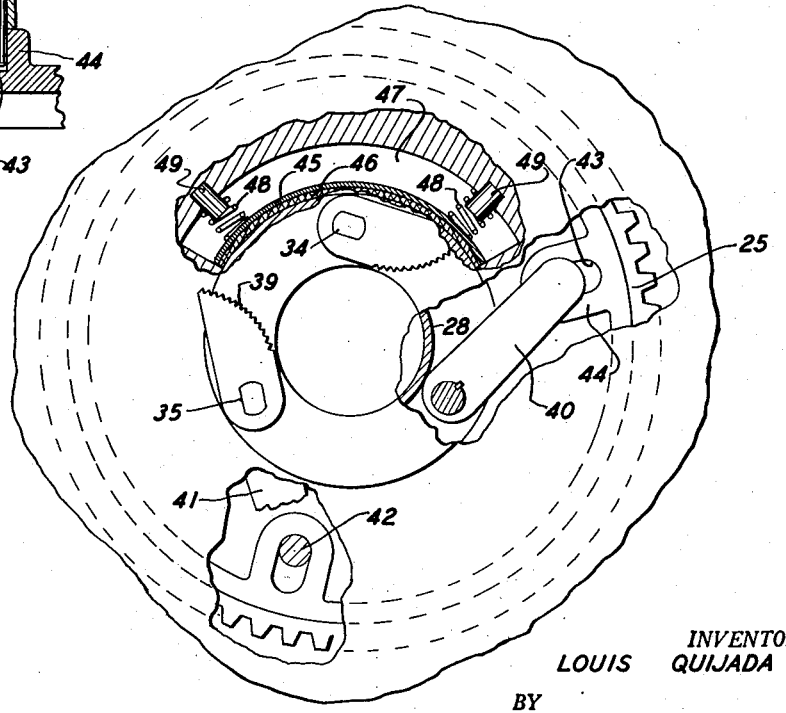
Fig. 5 is a cross-sectional view taken at line 5—5 of Fig. 2, with the housing partly broken away to show some of the mechanism.

Then to move the pipe or bolt forward, the motor must be reversed, thereby moving the grippers to the retracting position shown in Fig. 5. When the workpiece is moved forward the proper distance, the motor may then be switched to the forward direction to grip the workpiece again; whereupon the handle 65 of the die holder may be moved to the thread-cutting position and a new cut made as before.

It will be recognized that by the novel construction of my machine I have provided an unusually convenient work-holding chuck in that a simple turning on of the driving motor produces engagement of the gripping members and also turning of the workpiece. This chuck, furthermore, is not limited to use for threading pipe and the like, but may also be used for other work-turning operations.

I claim:

1. A drive for turning a workpiece comprising a hollow shaft through which the workpiece is passed, gripping cams for gripping the workpiece, the gripping cams being fastened to respective rotatable rods supported from the shaft, a gear wheel mounted for rotation in relation to the shaft, said gear wheel containing slots the longer dimensions of which extend radially, a power drive coupled with the gear wheel, and crank arms attached to the respective rods and having pins engaged in the slots of the gear wheel at a distance from the rods, the correlation and arrangement being such that rotation of the gear wheel causes the pins to slide radially in the respective slots and rotate the rods until the gripping cams grip the workpiece, after which the continued rotation of the gear wheel acts on the rods to rotate the hollow shaft to turn the workpiece.

2. A drive for turning a workpiece comprising a hollow shaft through which the workpiece is passed, gripping members for gripping the workpiece, rotatable rods rotatable through flanges of the shaft, said gripping members being mounted on respective ones of the rods, a gear wheel freely rotatable over a hub of the shaft, said gear wheel having slots, a power drive coupled with the gear wheel and crank arms attached to the respective rods, each crank arm having a pin at a distance from the rod, the pin being engaged in a respective slot of the gear wheel, whereby rotation of the gear wheel by the power-drive in the forward direction rotates the rod until the gripping members grip the workpiece, after which the continued rotation of the gear wheel rotates the hollow shaft to turn the workpiece, and backward rotation of the gear wheel ungrips the gripping members.

3. Apparatus according to claim 2 in which the drive is mounted in a housing and a friction band is supported from the housing and located around the hollow shaft and in sufficient frictional engagement therewith to prevent rotation of the shaft until the gripping members have gripped the workpiece.

4. A drive for turning a workpiece comprising a hollow shaft through which the workpiece is passed, a plurality of rotatable rods supported to the shaft at spaced intervals around the shaft, gripping members mounted on the rods for gripping the workpiece, a gear wheel mounted for rotation around the shaft, said gear wheel containing radially extending slots, a power drive coupled with the gear wheel, a crank arm attached to each rod and extending to one of the slots, a pin attached to the crank arm and engaging the respective slot, the crank arms being mounted on the opposite side of the gear wheel from the grippers.

5. A drive for turning a workpiece comprising a housing, a hollow shaft through which the workpiece is passed, said shaft being mounted for rotation within the housing, a plurality of gripping cams mounted for rotation at spaced positions of the shaft for gripping the workpiece, a gear wheel mounted for rotation around the shaft, said gear wheel containing slots extending in a generally radial direction, a power drive coupled with the gear wheel, a crank connected with each gripping cam and extending to a respective one of the slots, and pin means attached to each crank arm and engaging within the respective slot, so that said pin means can move back and forth within the slots in said generally radial direction when the gear wheel turns, and thereby rotating the gripping cams to and from the workpiece, whereby rotation of the gear wheel causes corresponding rotation of the shaft and workpiece when the gripping cams are moved into engagement with the workpiece.

6. A drive according to claim 5 in which a friction band is supported from the housing, said band extending at least partly around the hollow shaft and being movable toward and away from the shaft, and spring means engaged with the friction band urging the band into frictional engagement with the shaft whereby the band tends to prevent rotation of the shaft until the gripping cams grip the workpiece.

LOUIS QUIJADA.

REFERENCES CITED

The following references are of record in the file of this patent:

UNITED STATES PATENTS

| Number | Name | Date |
|---|---|---|
| 105,861 | Tasker | July 26, 1870 |
| 149,991 | Clever | Apr. 21, 1874 |
| 256,669 | Gassmann | Apr. 18, 1882 |
| 464,568 | Johnson | Dec. 8, 1891 |
| 762,947 | Saunders | June 21, 1904 |
| 1,151,857 | Bovee | Aug. 31, 1915 |
| 1,675,182 | Lilleberg | June 26, 1928 |
| 1,937,644 | Eaton | Dec. 5, 1933 |
| 1,943,643 | Vosper | Jan. 16, 1934 |
| 1,943,644 | Vosper | Jan. 16, 1934 |
| 1,973,232 | Thewes | Sept. 11, 1934 |
| 2,079,179 | Pealer | May 4, 1937 |
| 2,204,866 | Parish | June 18, 1940 |

FOREIGN PATENTS

| Number | Country | Date |
|---|---|---|
| 115,613 | France | Oct. 24, 1876 |
| 529,850 | Germany | July 17, 1931 |